United States Patent
Gagnerot

(10) Patent No.: US 11,070,359 B2
(45) Date of Patent: Jul. 20, 2021

(54) PROTECTION METHOD AND DEVICE AGAINST A SIDE-CHANNEL ANALYSIS

(71) Applicant: ESHARD, Martillac (FR)

(72) Inventor: Georges Gagnerot, Marseilles (FR)

(73) Assignee: ESHARD, Martillac (FR)

( * ) Notice: Subject to any disclaimer, the term of this patent is extended or adjusted under 35 U.S.C. 154(b) by 368 days.

(21) Appl. No.: 15/636,206

(22) Filed: Jun. 28, 2017

(65) Prior Publication Data

US 2017/0373837 A1 Dec. 28, 2017

(30) Foreign Application Priority Data

Jun. 28, 2016 (EP) .................................. 16176714

(51) Int. Cl.
| | | |
|---|---|---|
| *H04L 29/06* | (2006.01) | |
| *H04L 9/06* | (2006.01) | |
| *H04L 9/00* | (2006.01) | |
| *G06F 21/75* | (2013.01) | |
| *G06F 21/56* | (2013.01) | |
| *H04L 9/08* | (2006.01) | |

(52) U.S. Cl.
CPC .......... *H04L 9/0631* (2013.01); *G06F 21/568* (2013.01); *G06F 21/755* (2017.08); *H04L 9/003* (2013.01); *H04L 9/0869* (2013.01); *H04L 9/0877* (2013.01)

(58) Field of Classification Search
CPC .......................... H04L 9/0631; H04L 9/0869
See application file for complete search history.

(56) References Cited

U.S. PATENT DOCUMENTS

| | | | | | |
|---|---|---|---|---|---|
| 5,212,435 | A | * | 5/1993 | Dutro | ..................... H02K 17/08 318/785 |
| 5,309,474 | A | * | 5/1994 | Gilhousen | ............... H04J 13/10 370/209 |

(Continued)

FOREIGN PATENT DOCUMENTS

| | | |
|---|---|---|
| EP | 1267514 A2 | 12/2002 |
| EP | 1601132 A1 | 11/2005 |

(Continued)

OTHER PUBLICATIONS

Extended European Search Report from EP Appn. No. 16176714.0, dated Jan. 3, 2017, 6 pages.

(Continued)

*Primary Examiner* — Anthony D Brown
*Assistant Examiner* — Rodman Alexander Mahmoudi
(74) *Attorney, Agent, or Firm* — Brake Hughes Bellermann LLP

(57) ABSTRACT

A method for executing an operation by a circuit, may include executing a first operation to process an input data, the circuit generating during the execution of the first operation a first signal, and executing in the circuit a second operation receiving the input data and configured to add to the first signal, between first and second instants during the execution of the first operation, a continuous second signal. A combination of the first and second signal forming a resultant signal in which the second signal may be indistinctly measurable with the first signal from outside of the circuit. The second signal and the resultant signal varying as a function of the input data.

22 Claims, 4 Drawing Sheets

(56) References Cited

U.S. PATENT DOCUMENTS

| | | | |
|---|---|---|---|
| 6,278,783 | B1 | 8/2001 | Kocher et al. |
| 8,625,780 | B2 | 1/2014 | Peter et al. |
| 8,847,638 | B2* | 9/2014 | Chan .................. H03K 3/35613 327/118 |
| 2001/0053220 | A1 | 12/2001 | Kocher et al. |
| 2005/0259814 | A1 | 11/2005 | Gebotys |
| 2006/0056622 | A1 | 3/2006 | Liardet et al. |
| 2007/0076890 | A1 | 4/2007 | Muresan et al. |
| 2007/0160196 | A1 | 7/2007 | Timmermans |
| 2008/0019503 | A1 | 1/2008 | Dupaquis et al. |
| 2008/0130712 | A1* | 6/2008 | Chava .................... H03K 4/502 375/130 |
| 2008/0240443 | A1 | 10/2008 | Vuillaume et al. |
| 2009/0074181 | A1 | 3/2009 | Pelletier |
| 2009/0146528 | A1* | 6/2009 | Bachmaier ............ H01L 41/042 310/317 |
| 2010/0315145 | A1* | 12/2010 | Chee ..................... H03L 7/0812 327/258 |
| 2012/0250854 | A1 | 10/2012 | Danger et al. |
| 2013/0113450 | A1* | 5/2013 | Tang .......................... G05F 1/10 323/283 |
| 2014/0351603 | A1 | 11/2014 | Feix et al. |
| 2015/0169904 | A1 | 6/2015 | Leiserson et al. |
| 2016/0261403 | A1* | 9/2016 | Benoit .................... H04L 9/003 |
| 2016/0269175 | A1 | 9/2016 | Cammarota et al. |
| 2017/0075378 | A1* | 3/2017 | Ogasawara ............... G06F 1/04 |
| 2017/0104586 | A1 | 4/2017 | Hars |
| 2017/0242660 | A1* | 8/2017 | Katoh ............... G11C 13/0059 |
| 2017/0244552 | A1 | 8/2017 | Thiebeauld De La Crouee et al. |
| 2017/0373829 | A1 | 12/2017 | Wurcker et al. |
| 2017/0373832 | A1 | 12/2017 | Wurcker et al. |
| 2017/0373838 | A1 | 12/2017 | Wurcker et al. |

FOREIGN PATENT DOCUMENTS

| | | |
|---|---|---|
| GB | 2443355 A | 4/2008 |
| WO | 0108012 A1 | 2/2001 |

OTHER PUBLICATIONS

Extended European Search Report from EP Appn. No. 16176717.3, dated Jan. 3, 2017, 6 pages.

Extended European Search Report from EP Appn No. 16176721.5, dated Jan. 3, 2017, 7 pages.

Extended European Search Report from EP Appn. No. 16176716.5, dated Jan. 3, 2017, 7 pages.

Extended European Search Report from EP Appn No. 16176719.9, dated Jan. 5, 2017, 8 pages.

Extended European Search Report from EP Appn. No. 16176718.1, dated Dec. 22, 2016, 9 pages.

Bruneau, Nicolas, et al., "Multi-Variate Higher-Order Attacks of Shuffled Tables Recomputation", http:// eprint.iacr.org/2015/837.pdf, retrieved May 9, 2016, 20 pages.

Coron, Jean-Sebastien, "Higher Order Masking of Look-up Tables", International Association for Cryptologic Research, vol. 2014025:092212, Feb. 5, 2014, 22 pages.

Herbst, Christoph, et al., "An AES Smart Card Implementation Resistant to Power Analysis Attacks", Applied Cryptography and Network Security Lecture Notes in Computer Science; LNCS, Jan. 1, 2006, 14 pages.

Itoh, Kouichi, et al., "DPA Countermeansure Based on the "Masking Method"", ICICS 2001, LNCS 2288, 2002, pp. 440-456.

* cited by examiner

PROTECTION METHOD AND DEVICE AGAINST A SIDE-CHANNEL ANALYSIS

CROSS REFERENCE TO RELATED APPLICATIONS

This application claims priority to European Application Numbers EP16176714.0, filed Jun. 28, 2016, the disclosure of which is incorporated herein by reference.

TECHNICAL FIELD

The present disclosure relates to methods and devices for protecting a circuit or a program against side channel analysis and provide a value of a secret data handled by the circuit or program, and in particular, a circuit or a program for transforming a message by an encryption or decryption algorithm using a secret key.

The present disclosure also relates to devices implementing cryptographic algorithm such as secure devices (smart card integrated circuits), hardware cryptographic components integrated onto mother boards of computers and other electronic and IT equipment (USB drives, TV decoders, game consoles, etc.), or the like.

The present disclosure also relates to a circuit implementing a cryptographic algorithm such as AES (Advanced Encryption Standard). The present disclosure also relates to a program implementing such an algorithm, provided for being executed in a secure or non-secured environment.

BACKGROUND

Circuits implementing cryptographic algorithms can include a central processing unit (CPU), and a circuit dedicated to cryptographic computing, for example a cryptographic co-processor. These circuits may include thousands of logic gates that switch differently according to the operations executed. These switching operations create short variations in current consumption, for example of a few nanoseconds, and those variations can be measured. In particular, CMOS-type integrated circuits include logic gates that only consume current when they switch, i.e., when a logic node changes its state to 1 or to 0. Therefore, the current consumption depends on the data handled by the CPU and on its various peripherals: memory, data flowing on the data or address bus, cryptographic coprocessor, etc.

Furthermore, some software programs using encryption or obfuscation techniques, such as the White-Box Cryptography technique, may integrate secret data in such a way that it is very difficult to determine data by reverse engineering. Certain software programs may also receive a secret data from outside through a secure communication channel.

Such circuits may be subjected to so-called side channel analysis attacks based on observation of current consumption, magnetic and/or electromagnetic radiation. Such attacks provide detection of secret data, in particular encryption keys. Current side channel attacks implement statistical analysis methods such as SPA ("Single Power Analysis"), DPA ("Differential Power Analysis"), CPA ("Correlation Power Analysis") or EMA ("ElectroMagnetic Analysis").

SPA analysis normally only requires the acquisition of a single current consumption trace. SPA analysis provides information about the activity of the integrated circuit by observing part of the current consumption trace corresponding to a cryptographic computation, since the current consumption trace varies according to operations executed and data handled. Software may also undergo such side channel attacks when executed by a circuit.

DPA and CPA analyses enable the key of an encryption algorithm to be found by acquiring numerous circuit consumption traces and by statistically analyzing these traces to find the target information. DPA and CPA analyses can be based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of a stray capacitance of a MOS transistor). Alternatively, the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used in order to develop a consumption model that does not require knowledge of the structure of the integrated circuit in order to be applicable. DPA analysis involves amplifying this consumption difference using statistical processing on numerous consumption traces, aiming to highlight a measurement difference between two types of consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from the linear consumption model and a hypothesis on data to be discovered that is handled by the microcircuit and on the value of the encryption key.

Electromagnetic analysis (EMA) is based on the principle that an integrated circuit may send information in the form of near or far field electromagnetic radiation. Given that transistors and the wires connecting the transistors emit electromagnetic signals when their state changes, these signals can be treated like the current consumption variation signals by an analysis such as one of SPA, DPA and CPA analyses.

Other side channel analyses exist, such as "Template analysis" and "Mutual Information Analysis" (MIA). All of the above-mentioned analyses are based on a time alignment of all the analyzed traces. In other words, all the measurements performed at a given time, e.g., from the time the execution of a command is activated by the circuit, must correspond to the same data handled by the algorithm.

SUMMARY

In one general aspect, a method for executing an operation by a circuit may include executing a first operation to process an input data, the circuit generating during the execution of the first operation a first signal, and executing a second operation receiving the input data and configured to add to the first signal, between first and second instants during the execution of the first operation, a continuous second signal A combination of the first and second signal forming a resultant signal in which the second signal may be indistinctly measurable with the first signal from outside of the circuit. The second signal and the resultant signal varying as a function of the input data.

Implementations can include one or more of the following features. For example, the second signal may have a constant value depending on the value of the input data between the first and second instants. The second signal may vary between the first and second instants according to a profile depending on the value of the input data. The first and second signals may be either power consumption of the circuit or electromagnetic radiation of the circuit. The second operation may include controlling a variable resistor, using the input data between the first and second instants to generate the second signal in the form of an additional power consumption of the circuit, the first signal being the power consumption of the circuit.

The second operation may include generating a sequence of random numbers using as a seed the input data, and controlling the variable resistor using the random numbers of the sequence of random numbers at a clock rate, between the first and second instants. The second operation can include: dividing the input data into words, and controlling a plurality of variable resistors. Each of the words may be used to control a respective one of the variable resistors, between the first and second instants, to generate the second signal in the form of an additional power consumption in the circuit, the first signal being the power consumption of the circuit.

The second operation may include for each word of the input data, generating one sequence of random numbers depending only on the word, and controlling each of the variable resistors with the random numbers of a respective one of the random number sequences at a clock rate between the first and second instants.

The second operation may include a processing loop processing the input data between the first and second instants, or a third operation transforming the input data and a fourth operation which is identical or similar to the first operation and which processes a transformed data received from the third operation between the first and second instants.

The second operation can include controlling a variable capacitor, using the input data between the first and second instants to generate the second signal in the form of an additional electromagnetic radiation of the circuit, the first signal being an electromagnetic radiation of the circuit.

In another general aspect, a circuit including a first circuit part implementing a first operation and a second circuit part implementing a second operation is disclosed. The circuit may be configured to implement the method as above-defined.

Implementations can include one or more of the following features. For example, the first and second circuit parts may be interleaved or nested with respect to each other. The circuit can include a co-processor. The co-processor may include the first and second circuit parts, or a processor. The processor may include the first and second circuit parts.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

DETAILED DESCRIPTION

In view of the drawbacks and considerations noted above, It may be desirable to protect an integrated circuit against one or more of the side channel analyses. It may also be desirable to protect such a circuit against analyses exploiting power consumption traces or electromagnetic traces.

For instance, such circuits against side channel analysis may be described in French Patent application no. FR 16 51443 filed by the Applicant on Feb. 22, 2016, which disclose a method for analyzing traces representative of an activity of a circuit when the latter executes an operation successively on different input data. This method may include extracting a part of each trace, and generating a histogram from each extracted trace part, by counting an occurrence number of each possible value appearing in each of the extracted parts of these traces. Partial results of the operation may then be computed by applying the operation to each input data and to each possible value of a part of a secret key involved in the operation. Then, the method may identify for each possible part value of the secret key, all the input data which provide the same partial result. For each possible part value of the secret key, the occurrence numbers in the histograms, corresponding to the identified input data and the part value of the secret key may then be added. The part of the secret key can be determined by subjecting the added occurrence numbers to a statistical analysis. The statistical analysis may assume that if a value related to the secret key has leaked in the extracted parts of the traces, it can be highlighted by the added occurrence numbers.

Example embodiments may relate to a device including a circuit arranged on a medium, such as, for example, a plastic card.

Example embodiments may also relate to a computer program product loadable into an internal memory of a computer and including code portions which when executed by a computer configure the computer to carry out the steps of the method as above-defined.

Figure 1:
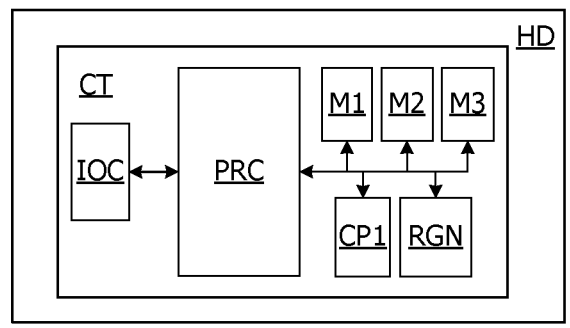
FIG. 1 illustrates a conventional architecture of a secure circuit.

FIG. 1 illustrates, a secure integrated circuit (CT) may be arranged on a portable medium HD such as a plastic card or any other medium, or in a terminal such as a mobile terminal, in accordance with an example embodiment. The integrated circuit CT may include a microprocessor PRC, an input/output circuit (IOC), memories (M1, M2, M3) coupled to the microprocessor by a data and address bus and, optionally, a cryptographic computation co-processor (CP1) or arithmetic accelerator, and a random number generator (RGN). The memories can include a volatile memory M1, for example a RAM-type ("Random Access Memory") memory containing volatile application data, a non-volatile memory M2, for example an EEPROM or Flash memory, containing non-volatile data and application programs, and possibly a read-only memory M3 (or ROM memory) containing the operating system of the microprocessor. The operating system can be also stored in the non-volatile memory.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an Near-Field Communications (NFC) controller, or a main circuit of a terminal such as a mobile terminal or a connected object.

In some implementations, the integrated circuit CT may be configured to execute operations such as encrypting, decrypting or signing messages that are sent to the integrated circuit CT, using a cryptographic function. This cryptographic function may be executed by the processor PRC of the circuit CT and/or partially or totally carried out by the processor PRC to the co-processor CP1.

Example embodiments protect an operation (e.g., in a cryptographic algorithm) implemented in a circuit, such as the circuit CT, against side channel analysis based on measurement of a primary signal emitted by the circuit, power consumption of the circuit and/or electromagnetic radiation emitted by the signal. This may be achieved by generating an additional signal (additional power consumption or electromagnetic radiation) to vary as a function of an input data of the operation to be protected, during the execution of the operation. The additional signal can be independent from a value of the input data or not. Each time a same input data is input to the circuit, the additional signal associated with the input data is generated. Thus, when the additional signal is absent, the signal measurable from outside of the circuit corresponds to a primary signal, and when the additional signal is present, the measurable signal corresponds to a resultant signal formed by a combination of the primary signal and the additional signal. In addition, the additional signal is generated so as to be indistinctly measurable with the primary signal in the signal measurable from outside of the circuit. The resultant signal also varies as a function of the input data.

In contrast with a random noise signal added according to known protection methods, the additional signal generated and added according to the present protection method is determined. Thus, the additional signal cannot be removed by statistical analyses of the signal emitted by the circuit when the latter executes a same operation applied to the same or different input data several times. For the same reason, such an additional signal cannot be removed as noise by the above-mentioned method analyzing traces measured from a circuit by computing and analyzing histograms produced from extracted trace parts. In fact, an additional signal depending on the input data shifts the obtained histograms according to the input data, and consequently removes the ability to distinguish a correct value using some statistical functions.

Figure 2:
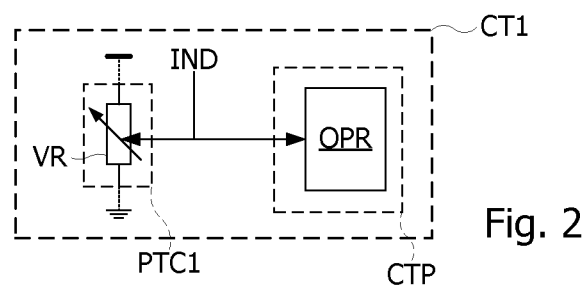
FIG. 2 illustrates a protection circuit according to an example embodiment.

FIG. 2 illustrates a circuit CT1 in accordance to an example embodiment. The circuit CT1 may include a circuit part CTP implementing an operation OPR to be protected, wherein the operation OPR may receive an input data IND. The circuit CT1 may further include a circuit part PTC1 in which the input data IND is applied and may generate a constant additional signal which appears to be added to a measurable signal generated by the circuit CT1 when the latter executes the operation OPR. The additional signal may be linked to the value of the input data IND but the additional signal may be physically independent from it, such that the value of the input data cannot be deduced from the additional signal. The additional signal can be set to a value between 1% and 33% of the maximum amplitude of the primary signal emitted by the circuit and measured from outside of the latter. In some implementations, the additional signal may be set to a value between 1% and 10% of the maximum amplitude of the signal emitted by the circuit and measured from outside of the latter.

In the example of FIG. 2, the circuit part PTC1 may include a controlled resistor VR having a resistance value controlled by a control signal generated from the input data IND. The resistor VR can be connected between a voltage source and a ground of the circuit CT1. Thus, the circuit part PTC1 may generate constant additional power consumption depending on the value of the input data IND. The additional power consumption may be added to the power consumption of the circuit CT1.

Figure 3:
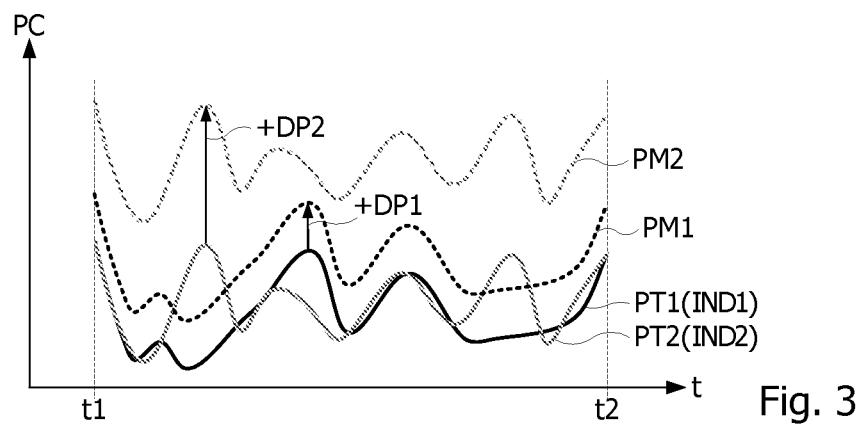
FIG. 3 illustrates power consumption traces, modified according to an example embodiment.

FIG. 3 illustrates a chart showing examples of power consumption traces PT1, PT2 acquired between instants t1 and t2, when the operation OPR is processing first and second distinct input data, respectively, without the circuit part PTC1 or when the latter is kept inactive. The power trace PT1 may be acquired when the circuit CT1 processes an input data IND1 and the power trace PT2 may be acquired when the circuit CT1 processes an input data IND2. The instants t1 and t2 may be determined from the activation of the operation OPR to process the data IND1 or IND2. When the operation OPR processes the input data IND1, the circuit part PTC1 may introduce in the power consumption of the circuit CT1 a constant additional consumption DP1. Thus, the circuit CT1 may produce a power trace PM1 corresponding to the power trace PT1 shifted from the latter by an offset value corresponding to the additional power consumption DP1. When the input data IND2 is processed by the operation OPR, the circuit part PTC1 may introduce in the power consumption of the circuit CT1 additional constant power consumption DP2 different from the additional power consumption DP1. Thus, the circuit CT1 may produce a power trace PM2 corresponding to the power trace PT2 but shifted from the latter by an offset value corresponding to the additional power consumption DP2.

The control signal applied to the resistor VR can be directly the input data IND or a value resulting from a transformation of the value of the input data IND. In some implementations, the command applied to the resistor VR can be IND/0xFF(=IND/255), if the input data IND is encoded on one byte. If the input data IND is encoded on two bytes, the control signal applied to the resistor VR can be IND/0xFFFF. The additional power consumption introduced by the resistor VR can be set to a value between 1% and a maximum value which can be set between 10% and 33% of the power consumption of the circuit Due to the link between a power offset applied by the resistor VR and the input data, and due to the fact that the respective contributions of the resistor VR and the execution of the operation OPR in the power consumption of the circuit, are not distinguishable or separately measurable, a statistical analysis of consumption power traces obtained with different input data cannot remove the power offsets. Hence, this protection method can be proved to be effective against the majority of the above-described side channel analyses. The operation OPR can be implemented by hardware e.g., a specific circuit such as the co-processor CP1. The circuit part PTC1 may be part of this specific circuit. The operation OPR can also be implemented by software executed by the processor PRC or the co-processor CP1. In this case, the circuit part PTC1 can be a part of the processor PRC or the co-processor. It should be noted that any other controlled component having power consumption depending on a value of a control signal can be used as an alternative of the variable resistor VR.

Figure 4:
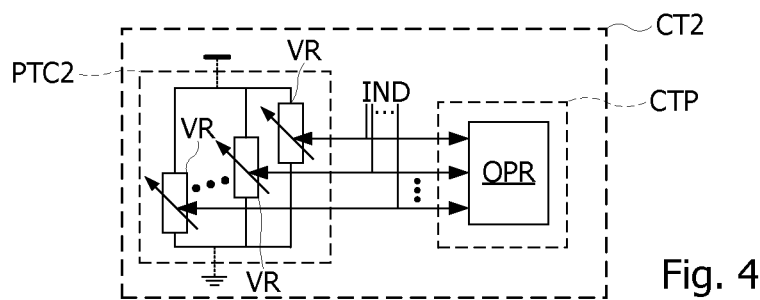
FIG. 4 illustrate a protection circuit according to an example embodiment.

FIG. 4 illustrates a circuit CT2 in accordance to an example embodiment. The circuit CT2 may include the circuit part CTP implementing the operation OPR to be protected, and a protection circuit part PTC2. In some implementations, the circuit part PTC2 can include several variable resistors VR, which may be identical or different, and connected in parallel, or in series. Each variable resistor VR of the circuit part PTC2 may be controlled using a part of the input data IND applied to the operation OPR. For example, the input data IND may be encoded on several bytes Each byte of the data IND may be used to control a respective variable resistor VR. In this way, it is possible to provide the offset values DP1, DP2 that can be applied to the power consumption traces of the circuit CT2, in particular to obtain a wider range of power offset values.

Figure 5:
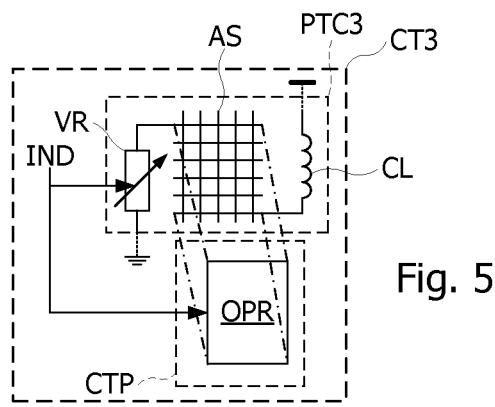
FIG. 5 illustrate a protection circuit according to an example embodiment.

FIG. 5 illustrates a circuit CT3 according to an example embodiment. The circuit CT3 may include the circuit part CTP performing the operation OPR and a circuit part PTC3 configured to emit electromagnetic radiations depending on the value of the input data IND. The circuit part PTC3 may include the variable resistor VR controlled via the input data IND and a component such as an inductance CL, for example a coil, forming a RL circuit with the resistor VR and an active shield AS. The RL circuit (VR-CL-AS) can be connected between a power source and a ground of the circuit. The active shield AS may cover at least a part of the circuit CT3 including the circuit part CTP. The ground can be a ground plane also covering at least a part of the circuit CT3. The circuit part PTC3 may be controlled to generate electromagnetic radiations as long as the circuit part CTP processes the input data IND. The resistor VR may generate in the circuit CT3 constant additional power consumption depending on the value of the input data IND.

Figure 6:
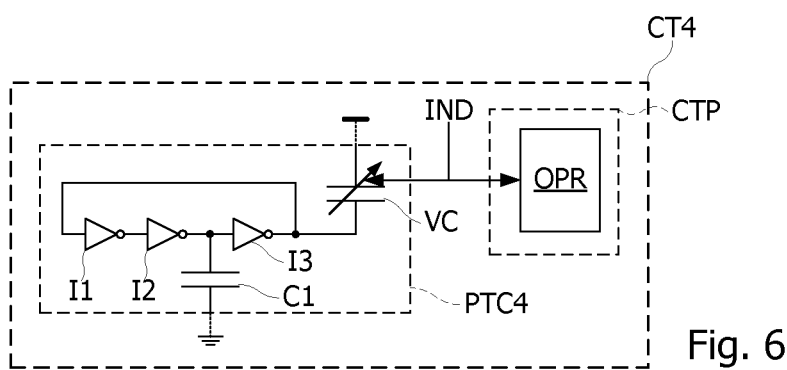
FIG. 6 illustrate a protection circuit according to an example embodiment.

FIG. 6 illustrates a circuit CT4 according to an example embodiment. The circuit CT4 may include the circuit part CTP implementing the operation OPR to be protected, and a protection circuit part PTC4. In some implementations, the circuit part PTC4 may include a variable capacitor VC controlled via the input data IND, and connected between a source voltage of the circuit CT4 and a circuit including an odd number of inverters I1, I2, I3 interconnected to form a ring oscillator. The circuit part PTC4 may further include a capacitor C1 connected between a junction node between the inverters I2 and I3 and a ground of the circuit CT4. The ring oscillator of the circuit PTC4 may produce a signal having a Dirac spectrum, which radiates an electromagnetic white noise having a magnitude depending on the value of the controlled capacitor VC.

Figure 7:
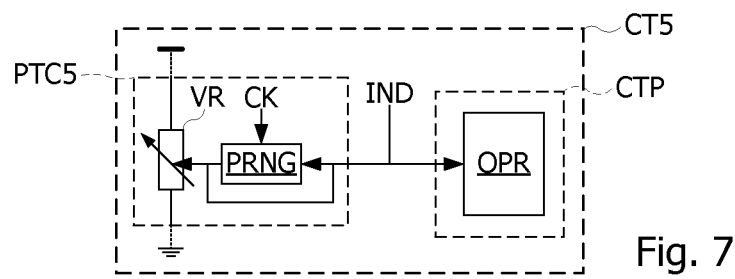
FIG. 7 illustrate a protection circuit according to an example embodiment.

FIG. 7 illustrates a circuit CT5 according to an example embodiment. The circuit CT5 may include the circuit part CTP implementing the operation OPR to be protected and a protection circuit part PTC5. In some implementations, the circuit part PTC5 may include a variable resistor VR controlled by an output of a pseudorandom number generator circuit PRNG receiving as a seed the input data IND of the operation OPR. The circuit PRNG may be configured to generate a random number that depends only on the value of the data applied to its input. The circuit PRNG may be clocked by a clock signal CK and its output may be fed back to its input to generate at each clock cycle a new random number using as a seed a random number generated at the previous clock cycle. Thus, the circuit PRNG may generate at a similar rate as the clock signal CK, a sequence of random numbers, which may consistently be the same for a given input data IND. As a result, the variable resistor VR may produce in the consumption power trace of the circuit CT5, a power offset that varies at each cycle of the clock signal CK, but the profile of the power may offset, which depends on the value of the input data IND. Accordingly, the random numbers of the sequence produced by the circuit PRNG can undergo a transformation (e.g., RND/0xFF, in which RND being a random number of the sequence) before being applied to the command input of the variable resistor VR.

Figure 8:
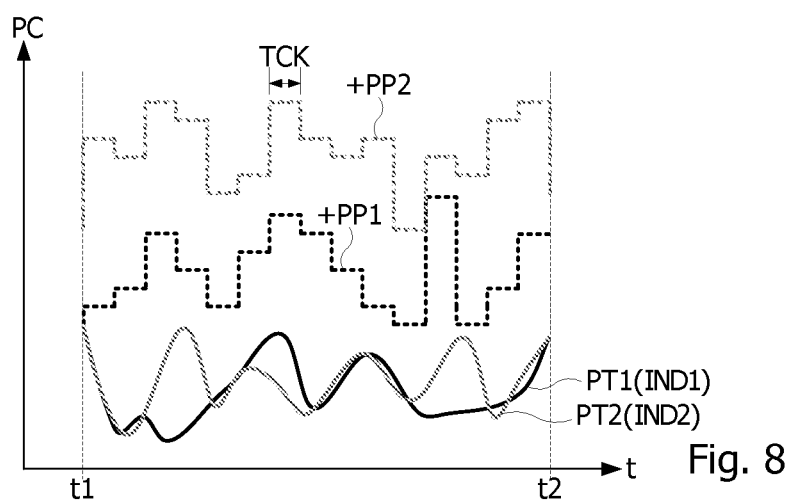
FIG. 8 illustrates power consumption traces, modified according to an example embodiment.

FIG. 8 illustrates a chart showing power consumption traces PT1, PT2 acquired between instants t1 and t2, when the input data IND1 and IND2 are processed by the operation OPR, respectively. FIG. 8 also illustrates an example of two power offset profiles PP1, PP2 produced by the resistor VR under control of the circuit PRNG receiving respectively the input data IND1 and IND2. The power offset profiles PP1, PP2 show that the resistor VR may generate power consumption that stay constant during a clock period TCK of the clock signal CK and that can change at each clock cycle. The shape of each of the power offset profiles PP1, PP2 only depends on the input data IND1, IND2 which is simultaneously applied to the operation OPR and to the input of the circuit PRNG. When another input data is applied to the operation OPR, this input data is at the same time applied to the input of the circuit PRNG which may generate a sequence of random numbers specific to the input data. Each random number of this sequence may be used to control the variable resistor VR.

Due to the variation of the power offset during the processing of an input data IND by the operation OPR, the power offset having a profile only linked to the input data IND currently processed by the operation, it may be possible to provide a protection method that can be effective against all of the above-described side channel analyses. The clock signal CK may not be necessarily the same or synchronized with a clock signal clocking the processing performed by the operation OPR.

In some implementations, the circuits of FIGS. 4 and 7 can be combined. For example, the circuit CT5 including one circuit part PTC5 per word in the input data IND may be combined. Thus, each word of the input data IND may be used as a seed which may be introduced in a pseudo random number generator generating a random number sequence controlling a respective variable resistor.

Figure 9:
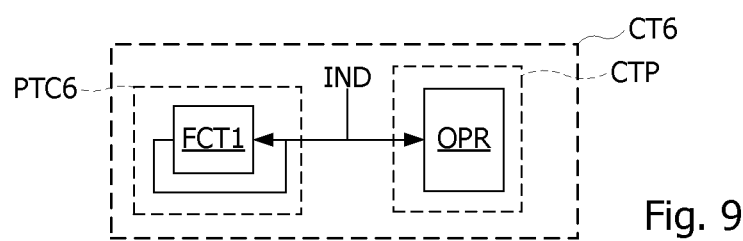
FIG. 9 illustrates a protection circuit according to an example embodiment.

FIG. 9 illustrates a circuit CT6 according to an example embodiment. The circuit CT6 may include the circuit part CTP implementing the operation OPR to be protected, and another circuit part PTC6 performing another operation FCT1, which may also receive the same input data IND at the same time as the operation OPR. The circuit part PTC6 may be configured to produce continuously an additional signal such as additional power consumption and/or additional electromagnetic radiations, varying during instants t1 and t2 according to a profile only depending to the input data IND. This additional signal may be added to the signal (i.e., power consumption and/or electromagnetic radiations) of the circuit CT6 performing the operation OPR. In some implementations, the circuit part PTC6 may include a processing loop performing the operation FCT1 applied first to the input data IND and then to an output data provided by the operation FCT1. The processing loop may be activated during the instants t1 and t2.

Figure 10:
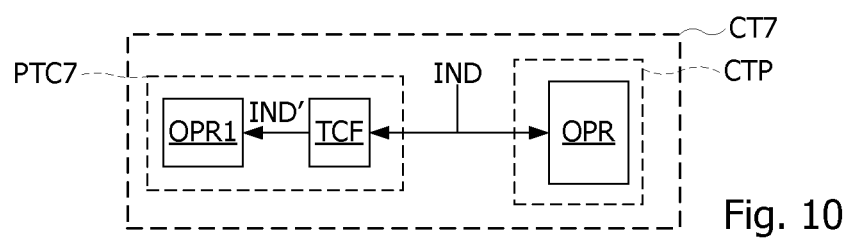
FIG. 10 illustrates a protection circuit according to another example embodiment.

FIG. 10 illustrates example of a circuit CT7 according to an example embodiment. The circuit CT7 may include the circuit part CTP implementing the operation OPR, and a circuit part PTC7 implementing a first operation TCF transforming the input data IND and an operation OPR1 applied to a transformed data IND' provided by the first operation TCF. The operation OPR1 can be the same as or similar to the operation OPR implemented by the circuit part CTP, such that the operation OPR1 implemented in the circuit part PTC7 can produce a same signal (power consumption and/or electromagnetic radiation) as the circuit CT7 when the latter executes the operation OPR on the same input data IND'. In this way, the circuit part PTC7 may generate both additional power consumption and additional electromagnetic radiation, as a function of the input data IND, with amplitudes of a same magnitude order as the circuit part CTP when the latter performs the operation OPR.

The operations OPR and OPR1 can be implemented, respectively, by the processor PRC and the co-processor CP1 of the circuit CT, or by two parts of the co-processor CP1, or by two cores, the processor PRC being in one embodiment a multicore processor. Hence, the two operations OPR, OPR1 implemented in the circuit parts CTP and PTC7 can be executed strictly at the same time. The circuit parts PTC7 and CTP can be physically entangled with one another or nested in one another such that it is not possible to measure separately their electromagnetic radiations.

The methods disclosed herein may be implemented by software programs executable by a computer system. Further, implementations may include distributed and/or parallel processing, especially for processing in parallel two operations receiving the same input data to produce indistinctly measurable signals, such as a power consumption variation signal or an electromagnetic radiation signal.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

Further, the disclosure and the illustrations are to be considered as illustrative rather than restrictive, and the appended claims are intended to cover all such modifications, enhancements and other embodiments, which fall within the true spirit and scope of the description. Thus, the scope of the following claims is to be determined by the broadest permissible interpretation of the claims and their equivalents, and shall not be restricted or limited by the foregoing description.

What is claimed is:

1. A method for executing an operation by a circuit, the method comprising:
    executing, by a circuit, a first computing operation configured to process an input data, the circuit incidentally producing, during an execution of the first operation, a first signal in the form of first electromagnetic radiation or a first power consumption signal; and
    executing, by the circuit between a first instant and a second instant during the execution of the first operation, a second operation configured to protect the circuit against side channel analysis, the execution of the second operation being based on the input data, the circuit producing, during the execution of the second operation, a second signal in the form of second electromagnetic radiation or a second power consumption signal, the second signal being continuous, different from the first signal and mixing with the first signal between the first instant and the second instant to produce a resultant signal,
    wherein the resultant signal is measurable from outside of the circuit as a resultant power consumption signal or resultant electromagnetic radiation, the first signal being indistinctly measurable within the resultant signal, the second signal and the resultant signal varying as a function of the input data.

2. The method of claim 1, wherein the second signal has a constant value depending on the input data, between the first instant and the second instant.

3. The method of claim 1, wherein the second signal has a value varying between the first instant and the second instant according to a profile varying as a function of the input data.

4. The method of claim 1, wherein the second operation includes controlling, between the first instant and the second instant, a variable resistor, using the input data to generate the second signal in a form of an additional power consumption of the circuit, the first signal being a power consumption of the circuit.

5. The method of claim 4, wherein the second operation includes:
    generating a sequence of random numbers using as a seed the input data; and
    controlling, between the first instant and the second instant, a variable resistor using random numbers of the sequence of random numbers at a clock rate.

6. The method of claim 1, wherein the second operation includes:
    dividing the input data into words; and
    controlling, between the first instant and the second instant, a plurality of variable resistors, each of the words being used to control a respective one of the plurality of variable resistors, to generate the second signal in a form of an additional power consumption in the circuit, the first signal being a power consumption of the circuit.

7. The method of claim 6, wherein the second operation includes:
    for each word of the input data, generating one sequence of random numbers depending only on the word; and
    controlling, between the first instant and the second instant, each of the plurality of variable resistors with random numbers of a respective one of the sequence of random numbers at a clock rate.

8. The method of claim 1, wherein the second operation includes at least one of:
    a processing loop processing the input data between the first instant and the second instant, or
    a third operation transforming the input data and a fourth operation which is identical or similar to the first operation and which processes, between the first instant and the second instant, a transformed data received from the third operation.

9. The method of claim 1, wherein the second operation includes controlling, between the first instant and the second instant, a variable capacitor using the input data to generate the second signal in a form of an additional electromagnetic radiation of the circuit, the first signal being an electromagnetic radiation of the circuit.

10. A circuit comprising:
a first circuit part implementing a first operation; and
a second circuit part implementing a second operation, the circuit configured to:
    execute the first operation, the first operation being configured to process an input data, the circuit incidentally producing during an execution of the first operation a first signal in the form of first electromagnetic radiation or a first power consumption signal, and
    execute the second operation between a first instant and a second instant during the execution of the first operation to protect the circuit against side channel analysis, the execution of the second operation being based on the input data, the circuit producing, during the execution of the second operation, a second signal in the form of second electromagnetic radiation or a second power consumption signal, the second signal being continuous, different from the first signal and mixing with the first signal between the first instant and the second instant to produce a resultant signal,
wherein the resultant signal is measurable from outside of the circuit as a resultant power consumption signal or resultant electromagnetic radiation, the first signal being indistinctly measurable within the resultant signal, the second signal and the resultant signal varying as a function of the input data.

11. The circuit of claim 10, wherein the first circuit part and the second circuit part are interleaved or nested in one another.

12. The circuit of claim 10, comprising one of:
a co-processor, the co-processor including the first circuit part and the second circuit part, or
a processor, the processor including the first circuit part and the second circuit part.

13. The circuit of claim 10, wherein the second signal has a constant value depending on the input data, between the first instant and the second instant.

14. The circuit of claim 10, wherein the second signal has a value varying between the first instant and the second instant according to a profile varying as a function of the input data.

15. The circuit of claim 10, wherein the second operation includes controlling, between the first instant and the second instant, a variable resistor, using the input data to generate the second signal in a form of an additional power consumption of the circuit, the first signal being a power consumption of the circuit.

16. The circuit of claim 15, wherein the second operation includes:
generating a sequence of random numbers using as a seed the input data; and
controlling, between the first instant and the second instant, a variable resistor using random numbers of the sequence of random numbers at a clock rate.

17. The circuit of claim 10, wherein the second operation includes:
dividing the input data into words; and
controlling a plurality of variable resistors, each of the words being used to control a respective one of the plurality of variable resistors, between the first instant and the second instant, to generate the second signal in a form of an additional power consumption in the circuit, the first signal being a power consumption of the circuit.

18. The circuit of claim 17, wherein the second operation includes:
for each word of the input data, generating one sequence of random numbers depending only on the word; and
controlling, between the first instant and the second instant, each of the variable resistors with random numbers of a respective one of the sequence of random numbers at a clock rate.

19. The circuit of claim 10, wherein the second operation includes at least one of:
a processing loop processing the input data between the first instant and the second instant, or
a third operation transforming the input data and a fourth operation which is identical or similar to the first operation and which processes, between the first instant and the second instant, a transformed data received from the third operation.

20. The circuit of claim 10, wherein the second operation includes controlling a variable capacitor, using the input data, between the first instant and the second instant, to generate the second signal in a form of an additional electromagnetic radiation of the circuit, the first signal being an electromagnetic radiation of the circuit.

21. A device including a circuit arranged on a medium, the circuit including a first circuit part implementing a first operation and a second circuit part implementing a second operation, the circuit being configured to:
execute the first operation, the first operation being configured to process an input data, the circuit incidentally producing, during an execution of the first operation, a first signal in the form of first electromagnetic radiation or a first power consumption signal; and
execute the second operation between a first instant and a second instant during the execution of the first operation to protect the circuit against side channel analysis, the execution of the second operation being based on the input data, the circuit producing, during the execution of the second operation, a second signal in the form of second electromagnetic radiation or a second power consumption signal, the second signal being continuous, different from the first signal, and mixing with the first signal between the first instant and the second instant to produce a resultant signal,
wherein the resultant signal is measurable from outside of the circuit as a resultant power consumption signal or resultant electromagnetic radiation, the first signal being indistinctly measurable within the resultant signal, the second signal and the resultant signal varying as a function of the input data.

22. A non-transitory computer-readable medium storing code portions which, when executed by a circuit, cause the circuit to:
execute a first operation, the first operation being configured to process an input data, the circuit incidentally producing, during an execution of the first operation, a first signal in the form of first electromagnetic radiation or a first power consumption signal; and
execute a second operation between a first instant and a second instant during the execution of the first operation to protect the circuit against side channel analysis, the execution of the second operation being based on the input data, the circuit producing, during the execution of the second operation, a second signal in the form of second electromagnetic radiation or a second power consumption signal, the second signal being continuous, different from the first signal, and mixing with the first signal between the first instant and the second instant to produce a resultant signal, wherein the resultant signal is measurable from outside of the circuit as a resultant power consumption signal or resultant electromagnetic radiation, the first signal being indistinctly measurable within the resultant signal, the second signal and the resultant signal varying as a function of the input data.

* * * * *